S. WILSON.
SHOCK ABSORBER.
APPLICATION FILED FEB. 3, 1917.
1,241,595.
Patented Oct. 2, 1917.
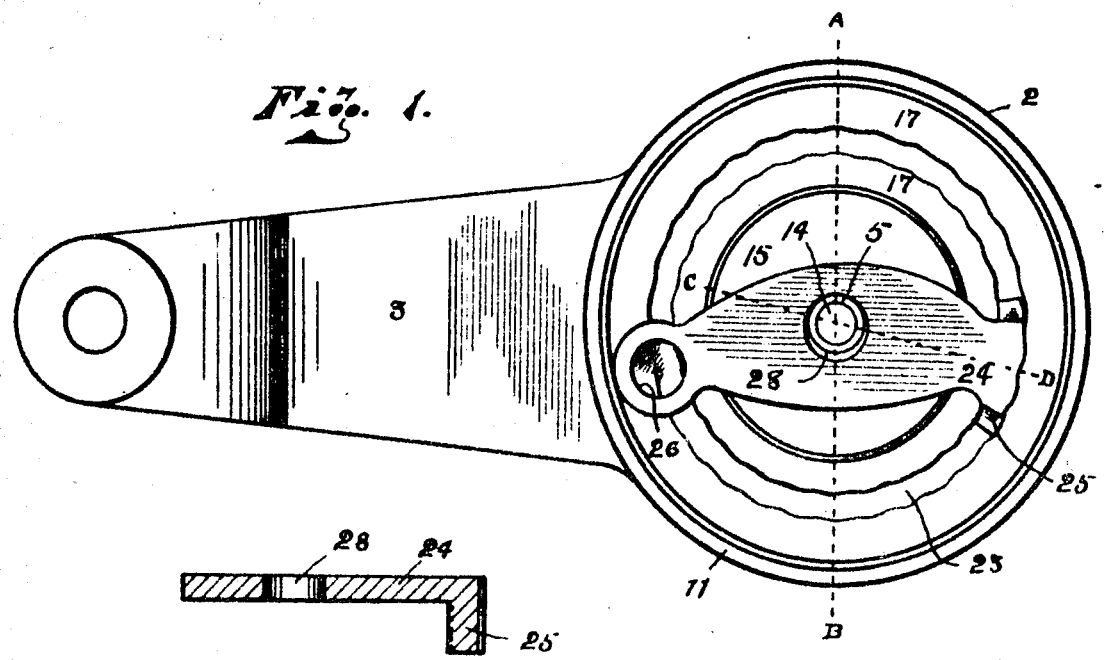
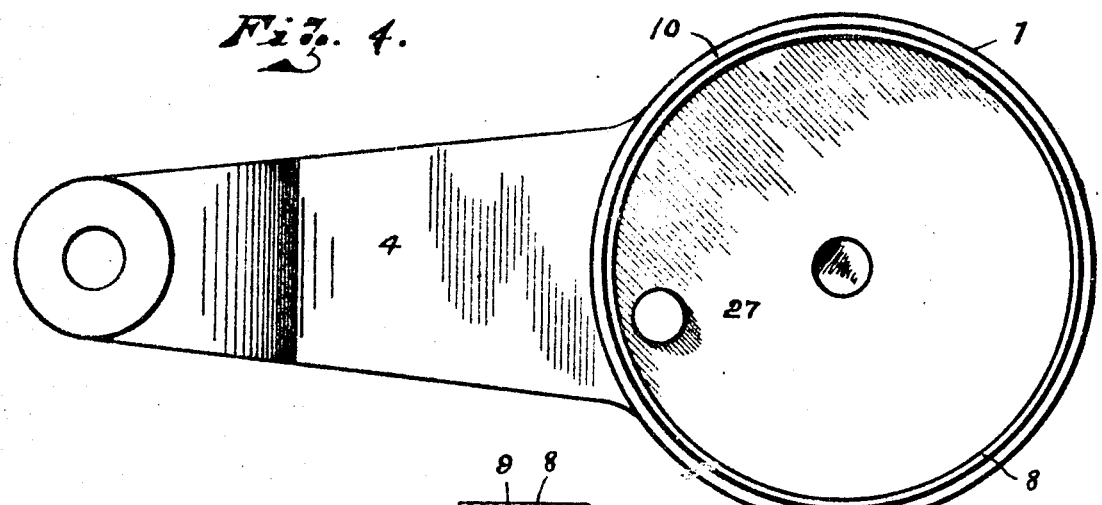
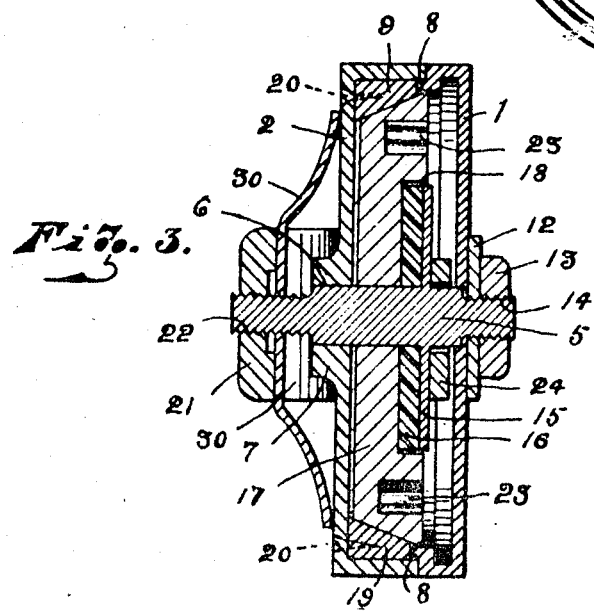
INVENTOR.
Sylvester Wilson.
BY S. Geo. Stevens
ATTORNEY.

UNITED STATES PATENT OFFICE.

SYLVESTER WILSON, OF CLOQUET, MINNESOTA.

SHOCK-ABSORBER.

1,241,595. Specification of Letters Patent. Patented Oct. 2, 1917.

Application filed February 3, 1917. Serial No. 146,496.

*To all whom it may concern:*

Be it known that I, SYLVESTER WILSON, a citizen of the United States, residing at Cloquet, in the county of Carlton and State of Minnesota, have invented certain new and useful Improvements in Shock-Absorbers, of which the following is a specification, reference being had therein to the accompanying drawing.

This invention relates to shock absorbers such as are particularly adapted for use on motor vehicles.

The principal object of my present invention is to provide such a device offering absorbing resistance to the reciprocal members to which it is attached only upon their separating motion.

Another object is to provide such a device in which the retarding motion is not applied instantly upon the commencement of separation of the reciprocal members, but will allow of certain free motion of the members before materially affecting same.

Another object is simplicity of construction and durability of wearing parts of the device and the entire absence of internal spring members.

Other distinguishing features and objects of the invention will appear in the further description of the example illustrating the preferred embodiment of my invention, as disclosed in the accompanying drawings and specifications in which like letters of reference indicate like parts.

Figure 1 is a plan view of one of the shock absorber disks showing the working parts mounted therein.

Fig. 2 is a similar view of the opposite coöperative disk.

Fig. 3 is a transverse sectional view on the line A—B, Fig. 1, of the shock absorber when assembled, and, Fig. 4 is a sectional view on the line C—D, Fig. 1, of the engaging and disengaging pawl.

The device consists of two coöperative hollow circular disks 1 and 2, each having formed integral therewith an arm, 4 and 3, respectively. These disks, when united, are mounted upon a central bolt 5 which acts as the axle of the disks, and upon which the disk 2 is fixed against free revolution thereupon by that portion of the axle 5 which extends therethrough as at 6, being squared and snugly fitting within a similarly squared hole through the hub 7 of the disk.

The disk 1 is revolubly mounted upon the axle 5 and has its principal bearing upon the circumferential flange 8 formed adjacent the outer edge thereof and which fits within the annular rim 9 of the disk 2. The faces 10 and 11 of the disks 1 and 2 frictionally abut each other.

The disk 1 is held in normal workable, frictional contact with the rim 9 of the disk 2 by means of a suitable flat nut 12 and lock nut 13, screw threaded upon the reduced end 14 of the axle 5. The axle 5 has a flat circular disk 15 formed integral therewith or rigidly fixed thereto, and which disk is slightly to one side of a central line between the two disks 1 and 2 and carries upon the inner face thereof a suitable wearing composition washer 16. A circular frictional clutch member 17 is loosely mounted upon the axle 5 intermediate the disk 2 and the wearing washer 16, it having a recess 18 therein formed concentric with the axis thereof to receive the washer and its supporting disk 15, the outer face of the latter being substantially flush with the face of the clutch member.

The clutch member 17 is somewhat thinner than the space between the wearing washer 16 and the inner face of the disk 2 to admit of tightening or loosening same without engagement with the disk 2. The circumferential face of the clutch member 17 is beveled inwardly toward the disk 2 and engages the circular wooden or composition friction filler block 19 fixed within the disk 2 by means of suitable screws 20, or otherwise, as desired.

The frictional contact between the circumferential face of the clutch 17 and the friction block 19 is that which is employed as the absorbing resistance, the frictional engagement of the washer 16 against the central portion of the clutch 17 being that only which is imparted by the adjusting nut 21 threaded upon the end 22 of the axle 5 in causing the clutch 17 to impinge the block 19. Any form of suitable resilient spider washer, such as illustrated at 30 and common in the art, may be employed intermediate the nut 21 and the disk 2 for the preferred slightly yieldable adjustment of the nut.

An annular groove or channel 23 is formed in the face of the clutch 17 adjacent the disk 1. The outer and inner walls of the channel are slightly corrugated as illustrated in Fig. 1, the corrugations coinciding with each other radially and the object of which will be described later. Loosely mounted upon the axle 5 between the disk 1 and the disk 15 is the engaging and disengaging pawl 24, it having an arched shaped head member 25 formed at right angles thereto and designed to normally loosely travel within the channel 23 of the clutch 17. The outer and inner walls of the head 25 are corrugated to coincide with the corrugation of the outer and inner walls of the channel and the thickness of the head is such that when in inactive position concentric with the channel, the clutch may revolve freely without the corrugations of the channel engaging the head, but when an eccentric position of the head 25 is assumed, the corrugated walls of the channel and head will engage each other and the head become bound within the channel, thus producing locked engagement therebetween. The opposite end of the pawl 24 has formed therein a circular hole 26 in which is loosely engaged the pin 27 fixed to the inner face of the disk 1, when the two disks 1 and 2 are coöperatively assembled for action. The hole 28 in the pawl 24 which surrounds the axle 5 is made sufficiently large to admit of an eccentric position, as above described, being assumed by the head 25, when the opposite end of the pawl is not being supported by the pin 27 to maintain the head in concentric position. Thus the pawl becomes actively engaged with the clutch 17 by the action of gravity.

While I have shown the channel 23 as having the side walls thereof corrugated, it is evident that this corrugation may be dispensed with and the walls of the channel made smooth, in which event the head 25 of the pawl 24 would also be made smooth and of a more snug fit within the channel.

However, I prefer to employ the corrugations for the express purpose of admitting of some considerable movement of the head 25 before becoming locked in the channel and carrying the clutch 17 with it.

This freedom of initial movement of the pawl will allow of the desired reciprocation of the members attached to the arms 3 and 4 of the shock absorber, so that the latter is not too prompt in its action for reasons well known in the art.

From the foregoing it is evident that I have devised an exceedingly simple, durable and efficient shock absorber, and while various modifications and changes permissible within the scope of the appended claims may be resorted to the construction disclosed has proven in practice exceedingly practical.

Having thus described my invention what I claim and desire to secure by Letters Patent, is:

1. A shock absorber comprising two oppositely disposed recessed coöperating, frictionally engaged disks each having rigidly fixed thereto independent external engaging means, an axle uniting the disks and upon which they are assembled, a clutch loosely mounted upon the axle intermediate the disks and frictionally contacting one of the disks, means carried by the axle and controlled by the other disk for interlockingly engaging and disengaging the clutch.

2. In a shock absorber, an axle, two oppositely disposed recessed disks mounted upon the axle, and in constant frictional engagement with each other, one revoluble with the axle and the other revoluble independent of the axle, independent operative means rigidly fixed to each disk, a clutch member loosely mounted upon the axle and in constant frictional engagement with one of the disks, and means upon the axle controlled by the other disk for engagement and disengagement with the clutch, whereby revolving relation between the disks is retarded in one direction only.

3. The combination with a shock absorber of the character described, comprising two coöperative frictionally engaged disks having independent operating means, of a second frictional engaging means within the disks and means operative alternately by gravity and by one of the disks for locking and unlocking respectively the second frictional engagement of the disks.

4. A shock absorber comprising a pair of coöperatively engaged disks, an axle upon which the disks are mounted and being carried by one of the disks, a friction clutch within the disks, a pawl mounted upon the axle and operated in one direction by one of the disks and in the opposite direction by gravity and which latter operation brings into action the friction clutch to retard the relative motion of the disks.

In testimony whereof I hereunto affix my signature in the presence of two witnesses.

SYLVESTER WILSON.

Witnesses:
L. C. SMITH,
S. GEO. STEVENS.